US 6,661,745 B1

(12) United States Patent
Tominaga et al.

(10) Patent No.: US 6,661,745 B1
(45) Date of Patent: Dec. 9, 2003

(54) OPTICAL REPRODUCING AND RECORDING METHOD, RECORDING MEDIUM, AND OPTICAL DEVICE

(75) Inventors: Junji Tominaga, 26-414-103, 4-chome Matsushiro, Tsukuba-shi Ibaraki 305-0035 (JP); Nobufumi Atoda, Tsukuba (JP); Hiroshi Fuji, Soraku-gun (JP); Hiroyuki Katayama, Nara (JP); Kenji Ohta, Kitakatsuragi-gun (JP)

(73) Assignees: Agency of Industrial Science and Technology, Tokyo (JP); Sharp Kabushiki Kaisha, Osaka (JP); Junji Tominaga, Tsukuba (JP)

( * ) Notice: Subject to any disclaimer, the term of this patent is extended or adjusted under 35 U.S.C. 154(b) by 0 days.

(21) Appl. No.: 09/537,235

(22) Filed: Mar. 28, 2000

(30) Foreign Application Priority Data

Mar. 29, 1999 (JP) ............................................ 11-085215
Mar. 28, 2000 (JP) ........................................ 2000-088378

(51) Int. Cl.$^7$ ................................................. G11B 7/00
(52) U.S. Cl. ................................ 369/13.33; 369/13.38; 369/275.1
(58) Field of Search ........................... 369/13.33, 13.38, 369/13.4, 13.41, 13.42, 13.46, 13.47, 13.51, 275.1, 284, 112.01, 112.02

(56) References Cited

U.S. PATENT DOCUMENTS

| 5,448,536 | A | * | 9/1995 | Muranishi et al. | ........... 369/283 |
| 5,576,084 | A | * | 11/1996 | Kuroda | ..................... 369/275.2 |
| 5,604,002 | A | * | 2/1997 | Tsujioka et al. | ............ 369/283 |
| 5,997,978 | A | * | 12/1999 | Ichihara et al. | ............ 428/64.1 |
| 6,187,406 | B1 | * | 2/2001 | Ichihara et al. | ............. 369/283 |
| 6,298,018 | B1 | * | 10/2001 | Takahashi et al. | ...... 369/112.23 |
| 6,329,036 | B1 | * | 12/2001 | Kikukawa et al. | ......... 428/64.1 |
| 6,396,775 | B1 | * | 5/2002 | Nakajima | ................. 369/44.14 |
| 6,404,722 | B1 | * | 6/2002 | Tseng et al. | ............. 369/13.17 |

FOREIGN PATENT DOCUMENTS

JP          04062090 A       2/1992

OTHER PUBLICATIONS

J. Tominaga et al, "An Approach For Recording and Readout Beyond the Diffraction Limit with an SB FilmIMIT "; American Institute of Physics; Applied Physics Letters, vol. 73, No. 15, pp. 2078–2080; Aug. 10, 1998.

N.Atoda et al, "Super–Rens—Super–Resolution Near–Field Structure", Journal of Electronics; pp. 100–102; Oct. 1998.

* cited by examiner

*Primary Examiner*—Thang V. Tran
*Assistant Examiner*—Bach Q Vuong
(74) *Attorney, Agent, or Firm*—Birch, Stewart, Kolasch & Birch, LLP

(57) ABSTRACT

An optical device and a recording medium are provided with a recording layer for recording information by radiation of light, and a mask layer which is formed closely to the recording layer, reduces its transmittance of light due to light or heat, and transmits light to the recording layer by using a near-field effect. An optical reproducing and recording method includes the steps of: emitting a laser beam onto the mask layer, generating a near field around an area of the mask layer that has transmittance being reduced by the laser beam, and reproducing or recording optical information in the recording layer by interaction between the near field and the recording layer. With this method, it is possible to provide the optical device, recording medium, and optical reproducing and recording method that can realize a high S/N ratio upon reproducing and recording and that can readily form a recording mark.

26 Claims, 5 Drawing Sheets

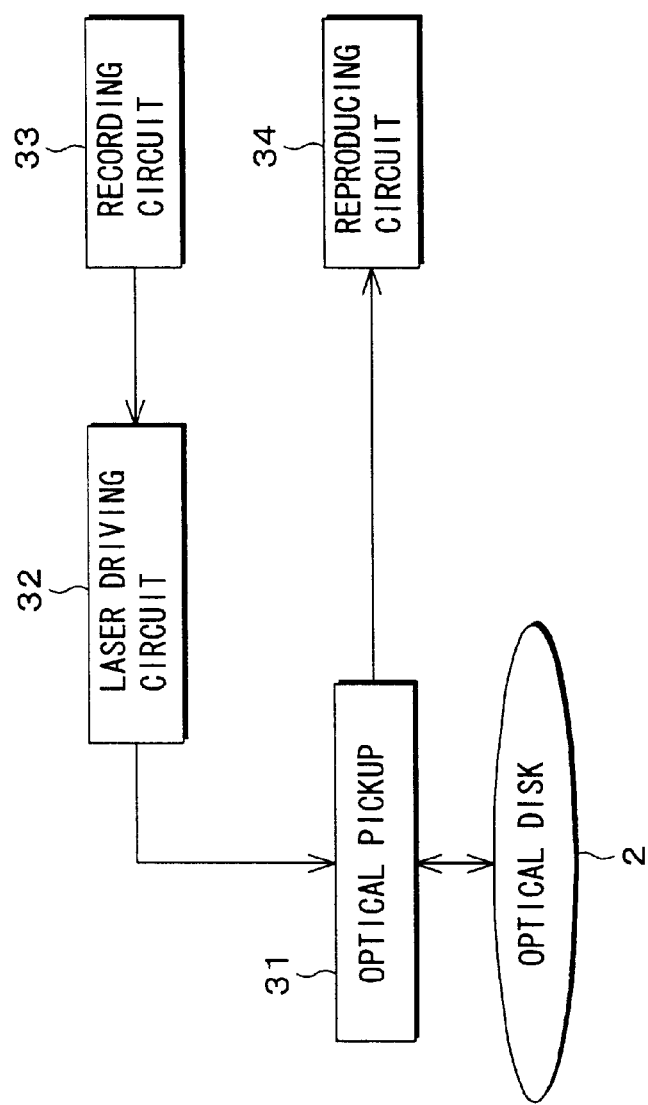

OPTICAL REPRODUCING AND RECORDING METHOD, RECORDING MEDIUM, AND OPTICAL DEVICE

FIELD OF THE INVENTION

The present invention relates to an optical reproducing and recording method, that is capable of optically reading or writing beyond a diffraction limit of light by using a near field, and further concerns a recording medium and an optical device.

BACKGROUND OF THE INVENTION

Conventionally, a recording or reproducing technique using a near field has been disclosed in a magazine "Electronics, Oct. issue, in 1998, pp. 100–102, (published by Ohm Corp.)" and in a paper "Applied Physics Letters, Vol. 73, No.15, published on Oct. 12, 1998, pp. 2078–2080".

Referring to FIG. 5, the following explanation describes a reproducing technique using a near field. In FIG. 5, a laser beam 101 is focused by an object lens and is emitted to an optical disk 102. Here, in the optical disk 102, a protection layer 112, a mask layer 113 formed by an antimony film, a protection layer 114, and a recording layer 115 composed of a phase change material such as GeSbTe are deposited in this order on a substrate 111.

In the mask layer 113, the center of a spot of the focused laser beam 101 has a higher temperature, and the opaque center is changed to transparent one so as to form an aperture 103 as a transparent area. The thickness of the protection layer 114 is set such that near-field light 105 generated at the aperture 103 interacts with the recording layer 115.

According to this arrangement, the aperture 103 whose diameter is smaller than a spot diameter appears in the mask layer 113, so that it is possible to read out information recorded in the recording layer 115 from a recording mark 104 through the aperture 103 even if the recording mark 104 is small with a size of 100 nm or less.

However, in the above-mentioned reproducing technique, light is shut off on the mask layer 113 other than the aperture 103, and information is read out from the recording mark 104 merely through the minute aperture 103, resulting in a smaller amount of light from the recording mark 104. Therefore, in the above conventional art, an S/N ratio is reduced so as to cause difficulty in positively reproducing information.

Further, in the conventional art, the minute aperture 103 is used for recording as well, so that an amount of light is reduced and the recording marks 104 cannot be formed with sufficient sizes.

Additionally, in the conventional art, when increasing an amount of light upon recording to form the sufficiently large recording marks 104, the recording marks 104 become too large, so that a high-density recording cannot be achieved.

SUMMARY OF THE INVENTION

In order to solve the above-mentioned problems, the objective of the present invention is to provide an optical reproducing and recording method, a recording medium, and an optical device that can achieve a high S/N ratio upon reproducing and recording or can easily form a recording mark by increasing an amount of light received from the recording mark and an amount of light transmitted to the recording mark.

In order to overcome the aforementioned problems, the optical reproducing and recording method of the present invention includes the steps of: emitting a light beam onto a mask layer which is formed on a substrate containing a sample having information and which reduces its transmittance of light due to light or heat; and reproducing or recording the information by interaction between the sample and a near field which appears around an area of the mask layer, the area having transmittance being reduced by the light beam.

Therefore, with this method, light of the near field is generated in the sample and around the area of the mask layer that reduces its transmittance, so that it is possible to realize interaction between the sample and light of the near field, and the interaction generates scattered light from light of the near field based on the information.

In this case, according to this method, it is possible to detect the scattered light from a larger area having a high transmittance of light on the mask layer other than the area in which transmittance of light is reduced, thereby reproducing information of the sample with a high S/N ratio.

In order to solve the aforementioned problems, another optical reproducing and recording method of the present invention adopts a mask layer in which free electrons increase due to light or heat, instead of the mask layer in which transmittance is partially reduced by a light beam.

Hence, with this method, plasmon is pumped in a minute area in which free electrons increase due to a light beam, so that it is possible to write or read information of the sample in a near field, which is generated by the plasmon with high intensity around the minute area. Thus, according to this method, the near field with high intensity makes it easy to write information into the sample, and when reading information from the sample, the near field with high intensity makes it possible to read the information with a higher S/N ratio.

In order to solve the aforementioned problems, the recording medium of the present invention is provided with a recording layer for recording information by radiation of a light beam, and a mask layer, in which transmittance of light is reduced by a light beam so as to form the near field in the recording layer, on a substrate.

This arrangement makes it possible to detect the scattered light from a larger area having a high transmittance of light on the mask layer other than an area in which transmittance of light is reduced, thereby reproducing information of the recording layer with a high S/N ratio.

In order to solve the aforementioned problems, another recording medium of the present invention is provided with a recording layer which records information by radiation of a light beam, and a mask layer in which free electrons are increased by a light beam so as to form a near field in the recording layer by the light beam.

According to this arrangement, plasmon is pumped in a minute area in which free electrons increase due to radiation of a light beam, so that it is possible to write or read information of the recording layer in a near field, which is generated by the plasmon with high intensity around the minute area. Thus, according to this method, the near field with high intensity makes it easy to write information into the recording layer, and when reading information from the recording layer, the near field with high intensity makes it possible to read the information with a higher S/N ratio.

In order to solve the aforementioned problems, the optical device of the present invention has a construction in which the substrate contains the sample; an optical system records or reproduces optical information of the sample being disposed so as to emit a laser beam to the sample; and the mask layer, in which transmittance of light is reduced by the laser beam, is disposed so as to form the near field in the sample by the laser beam.

Therefore, according to this arrangement, when a light beam is emitted onto the mask layer, it is possible to partially form an area in which transmittance of light is reduced on the mask layer, so that light of the near field can be generated around the area on a part of the sample that corresponds to the area.

Hence, this arrangement makes it possible to realize interaction between the sample and light of the near field, so that the interaction can generate scattered light from light of the near field based on information.

Consequently, according to this arrangement, it is possible to detect the scattered light from a larger area having a high transmittance of light on the mask layer other than an area in which transmittance is reduced. Hence, it is possible to reproduce information of the sample with a higher S/N ratio.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a block diagram schematically showing the optical device.

DESCRIPTION OF THE EMBODIMENTS

[Embodiment 1]

Figure 1A:
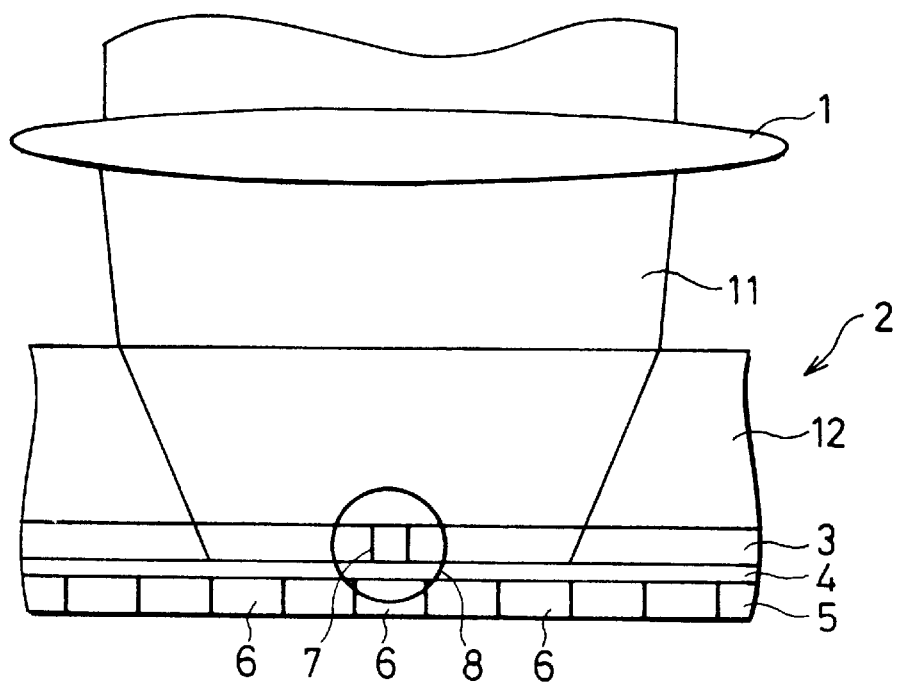
FIG. 1(a) is a schematic diagram showing an optical reproducing and recording method, an optical disk, and an optical device in accordance with Embodiment 1 of the present invention.
Figure 1B:
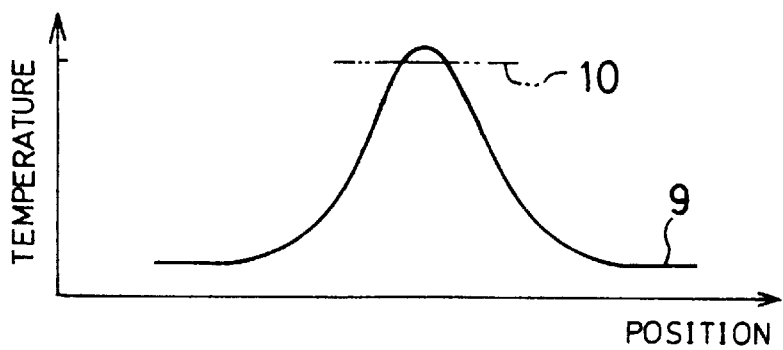
FIG. 1(b) is a graph showing a temperature distribution on a mask layer of the optical device.

Referring to FIGS. 1 and 2, the following explanation describes Embodiment 1 of an optical reproducing and recording method, a recording medium and an optical device in accordance with the present invention.

The optical device of Embodiment 1 is provided with an optical disk (recording medium) 2 for recording and reproducing information. In the optical disk 2, a mask layer 3, a protection layer 4, and a recording layer (sample) 5 are stacked in this order on a substrate (base) 12. The substrate 12 has a thickness of several to ten-odd millimeters. Each of the mask layer 3, the protection layer 4, and the recording layer 5 has a thickness of several tens of nm. In the optical device, a laser beam (light beam) 11 gathered by an object lens 1 is emitted to the optical disk 2, which serves as an optical recording medium, from a surface which is opposite to a surface having the mask layer 3 and others formed thereon.

The substrate 12 is made of a material such as glass and polycarbonate having a property of transmitting light. The protection layer 4 is made of a dielectric substance such as SiN and AlN. The recording layer 5 is made of a magneto-optical recording material such as GdTeCo which is capable of recording digital information due to perpendicular magnetization.

The magneto-optical recording material is characterized in that the laser beam 11 is emitted so as to partially increase the temperature of the material in accordance with a Gaussian distribution; thus, a direction of perpendicular magnetization varies based on digital information due to a change in a magnetic property and an external magnetic field changed in accordance with the digital information.

Hence, in the optical device, interaction between the laser beam 11 and the recording layer 5, namely, light reflected from the recording layer 5 changes its Kerr rotation angle in accordance with directions of perpendicular magnetization that are determined based on digital information. Therefore, in the optical device, the change of the Kerr angle is detected so as to reproduce the information.

Moreover, in the optical device, the recording layer 5 can be also made of a phase change material such as GdSbTe, which shows a phase change at the area above the predetermined temperature in the laser beam emitted zone having the Gaussian distribution. In such an optical device, information can be reproduced in response to a change in a degree of light reflectance from the recording layer 5, the change being based on a phase change corresponding to the information, namely, in response to a change in the amount of reflected light.

The mask layer 3 is made of a material showing a thermo-optical effect in which transmittance of light is reduced in accordance with an increase in temperature, or a material showing a thermo-optical effect in which transmittance of light is reduced only in an area receiving a large amount of light. As the mask layer 3, it is possible to adopt a material such as polymeric material (d-PFMA:deuterated fluoromethacrylate polymer) showing the above thermo-optical effect.

Next, the following explanation describes an optical reproducing and recording method using the above optical device. Firstly, when the laser beam 11 is emitted, a temperature distribution 9 serving as a Gaussian distribution appears on the mask layer 3. In the above emitted area, transmittance of light is reduced at the center whose temperature increases to more than a threshold temperature 10. Therefore, an oval area 7 appears so as to correspond to a near field 8 with a low transmittance of light at the center of a light spot formed by the emitted laser beam 11.

The optical disk 2 is normally driven to rotate, so that the area 7 with a higher temperature is formed into an oval shape in a track direction (circumferential direction of the optical disk 2). The area 7 is obtained by emitting the laser beam 11 while the optical disk 2 is driven to rotate.

At this point, the laser power of the laser beam 11 is suitably adjusted so as to set the size of the area 7, namely, a major axis of the area 7 at 100 nm or less. The size of the area 7 is sufficiently smaller than a wavelength of the laser beam 11, so that it is possible to generate light of the near field around or near the area 7 on the recording layer 5.

The protection layer 4 has a thickness of several tens of nm or less, which is shorter than a maximum reach of light from the near field, so that light of the near field 8 is emitted between the mask layer 3 and the recording layer 5 and it is possible to receive light of the near field 8 from the recording layer 5. With this arrangement, the size of the near field 8 is also set at several tens of nm, so that in the recording layer 5, it is possible to write and read the recording mark 6 with virtually the same size as the generated near field 8, in the same manner as the conventional art.

Further, upon reading, transmittance is high in the mask layers 3 other than the area 7, which is the center of the light spot, so that scattered light is gathered at the object lens 1 after passing through areas other than the area 7 of the mask layer 3, and the scattered light is detected as light for reading (reproducing light). The scattered light is generated by interaction between light of the near field 8 and the recording mark 6 so as to include information.

Incidentally, in the conventional art, transmittance is high only on a minute aperture where a laser beam is emitted, so that a recording mark is read only through the aperture. Therefore, in the conventional art, the intensity of light for reading, that is detected through the aperture, is small, so that an S/N ratio is low upon reading.

Meanwhile, in the present invention, scattered light is detected through an area other than the area 7 corresponding to the center of the spot. The area is larger than the area 7 and is capable of transmitting light. Thus, even in the case of an aperture which allows the recording mark 6 to have a smaller size so as to have a higher recording density, a larger amount of light from the recording mark 6 can be obtained, so that it is possible to obtain a reproduction signal with a higher S/N ratio.

The following explanation discusses variation of the present invention. Firstly, the material of the mask layer 3 can be replaced with a material in which free electrons increase (conductance increases) according to rise in temperature, or a material in which free electrons increase (conductance increases) only in an area receiving a large amount of light. For example, it is possible to adopt a material such as an organic compound (TTF-TCNQ:tetrathiafulvalene-tetracyanoquinodimethane) and inorganic compound ($NdSe_3$), which generates a metal-insulator shift.

In this case, the area 7 having more free electrons appears at the center of the spot of the laser beam 11. The free electrons pump plasmon due to resonances with the laser beam 11. It has been known that an electric field of plasmon has intensity of several tens to several hundreds times that of the laser beam 11 (see Japanese Published Unexamined Patent Application No. 62090/1992 (Tokukaihei 4-62090, published on Feb. 27, 1992)).

Therefore, a laser power of the emitted laser beam 11 is suitably adjusted so as to generate the near field 8 with a high intensity around or near the area 7. According to this arrangement, it is easy to form the minute recording marks 6 in the recording layer 5, thereby increasing an S/N ratio upon recording.

Further, when the mask layer 3 is made of a material which increases free electrons and reduces transmittance of light according to temperature increase caused by radiation of the laser beam 11, it is possible to more efficiently detect scattered light intensified by plasmon as light for reading. Thus, an S/N ratio can be improved upon reproduction.

Additionally, unlike the optical recording medium disclosed in Japanese Published Unexamined Patent Application No. 62090/1992 (Tokukaihei 4-62090), the recording layer 5 and the mask layer 3 are separated from each other in the present invention, so that it is possible to freely select a material reducing transmittance or a material increasing free electrons regardless of the recording materials. Thus, in the present invention, it is possible to respectively optimize the materials and to readily manufacture the optical recording medium.

FIG. 2 is a block diagram showing the optical device for recording and reproducing information for the optical disk 2. In such an optical device, a record signal outputted from a recording circuit 33 is inputted to a laser driving circuit 32, and recording light emitted from a semiconductor laser of an optical pickup 31 is emitted to the optical disk 2, so that information is recorded. Upon reproduction, reproducing light is emitted to the optical disk 2 with a smaller amount than upon recording, the reproducing light is changed into an electric signal in a photo detector of the optical pickup 31, and information is reproduced in a reproducing circuit 34. The amount of light is adjusted in the laser driving circuit 32. The occurrence of the near field 8 in the mask layer 3 is suitably controlled by adjusting an amount of light in the mask layer 3 of the optical disk 2. Such an optical device can be adopted in the following Embodiments 2 and 3 as well.

Additionally, in FIG. 1(a), it is also possible to interchange the recording layer 5 and the mask layer 3 and to emit the laser beam 11 onto the mask layer 3 through the recording layer 5 so as to generate the area 7. In this case as well, the near field 8 appears in the area 7 as described above, and the recording mark 6 can be recorded and reproduced in the area 7.

[Embodiment 2]

Figure 3A:
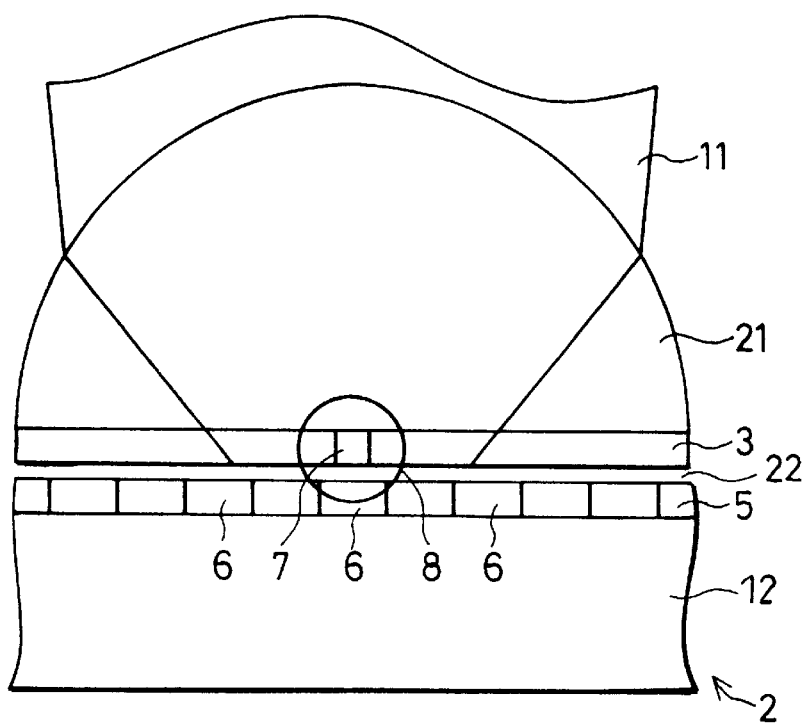
FIG. 3(a) is a schematic diagram showing an optical reproducing and recording method, an optical disk, and an optical device in accordance with Embodiment 2 of the present invention.
Figure 3B:
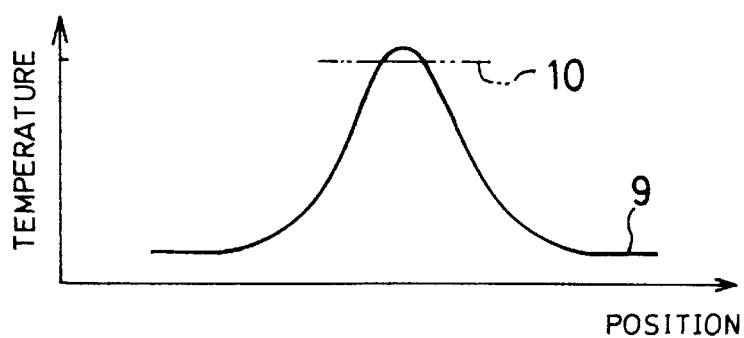
FIG. 3(b) is a graph showing a temperature distribution on a mask layer of the optical device.

Referring to FIG. 3, the following explanation describes Embodiment 2 of the present invention. Here, in Embodiment 2, those members that have the same functions and that are described in Embodiment 1 are indicated in FIG. 3 by the same reference numerals as those of FIGS. 1 and 2, and the description thereof is omitted.

In Embodiment 2, the laser beam 11 is directed to a hemispheric lens 21 and is gathered (focused). A mask layer 3 is formed on the bottom of the hemispheric lens 21 (hereinafter, referred to as SIL (Solid Immersion Lens) 21). As a material for the mask layer 3, as described in Embodiment 1, it is possible to adopt a material reducing its transmittance only in an area where the temperature rises or the amount of light is large, or a material in which free electrons increase due to rise in temperature or radiation of light. Here, the above-mentioned bottom is a surface of the SIL 21 that emits light directed from a laser beam 11.

The SIL 21 is arranged so as to float above an optical disk 2 via a gap 22 while being adjacent to the recording layer 5 of the optical disk 2, at least upon recording and reproducing. The gap 22 is formed with a distance of several tens of nm or less by, for example, floating the SIL 21 with air from the optical disk 2.

In the optical disk 2, a recording layer 5 is stacked on a substrate 12. A distance between the SIL 21 and the gap 22 is shorter than a maximum reach of a near field 8. Thus, the near field 8 reaches the recording layer 5 via the gap 22. Thus, as described in Embodiment 1, this arrangement makes it possible to readily record a signal transmitted in the recording layer 5 and to increase an S/N ratio of a reproduction signal.

Additionally, it is possible to dispose a protection layer (not shown), which optically has the same thickness as the gap 22, a) on an optical path between the recording layer 5 and the SIL 21 above the recording layer 5, b) below the mask layer 3, or c) both above the recording layer 5 and below the mask layer 3 (in these cases, the sum of the thicknesses is set at the optical thickness of the gap 22) while the SIL 21 and the optical disk 2 are in contact with each other. Here, 'above' indicates a light source side on the optical path, and 'below' indicates a side of the recording layer 5 on the optical path.

Moreover, the position of the mask layer 3 is not limited to the SIL 21. For example, it is also possible to dispose the mask layer 3 on a plane substrate and slide the substrate on the optical disk 2. However, with the SIL 21, the spot diameter of the laser beam 11 can be set smaller so as to increase the intensity of the near field 8.

Embodiment 2 is different from Embodiment 1 in that the mask layer 3 and the recording layer 5 are separately provided. Therefore, an observation sample is disposed instead of the optical disk 2, so that it is possible to readily realize an optical microscope which can observe an optical image with a high resolution.

The following explanation discusses the detail of the SIL 21. The SIL 21 is a convex lens for reducing a wavelength of light gathered by a typical convex lens serving as a light-gathering lens on the recording layer 5, by utilizing a refractive index of a material of the SIL 21, that is larger than that of air (refractive index is 1), so as to improve resolution of light gathered on the recording layer 5. Here, the SIL 21 can be formed into an ultra-hemisphere as well as a hemisphere. However, for convenience of explanation, Embodiment 2 describes only the hemispheric SIL 21.

The SIL 21 has a central axis corresponding to an optical axis of a parallel light pencil P1 of the laser beam 11. The SIL 21 has a hemispheric surface for receiving light and a plane surface for emitting light (perpendicular to the central axis of the SIL 21). In Embodiment 2, the refractive index of the SIL 21 is set at N1 (>1).

With this arrangement, emitted light of the parallel light pencil P1 (wavelength =$\lambda$) is changed into a light pencil with a numerical aperture of NA and a wavelength of $\lambda$/N1 in the SIL 21, and the parallel light pencil is emitted from the plane surface (bottom) of the SIL 21 and gathered to the recording layer 5.

Here, when increasing the numerical aperture to reduce a beam spot gathered on the recording layer 5, an entry angle to the recording layer 5 and the plane surface of the SIL 21 is increased, resulting in reflection on a surface of the recording layer 5 and the plane surface of the SIL 21. Consequently, loss may occur in an amount of light.

Therefore, in the present invention, the SIL 21 is disposed above the recording layer 5 such that the plane surface of the SIL 21 is close to the recording layer 5 via a distance of the gap 22 (wavelength $\lambda$ or less of the used laser beam, more preferably, a distance of $\lambda$/4 or less such as several tens of nm or less).

With this arrangement, from the entire of the plane surface of the SLI 21, evanescent light serving as light of the near field 8 is transmitted to the adjacent recording layer 5. Namely, a light pencil emitted from the plane surface of the SIL 21 is coupled to the recording layer 5 due to a near field effect and travels in virtually the same direction as a travelling direction in the SIL 21. Therefore, it is possible to efficiently direct a gathered light pencil to the recording layer 5 without causing large reflection upon emitting light from the SIL 21 to the recording layer 5.

In this case, a light pencil directed to the recording layer 5 has the same property as light being propagated through the SIL 21. Hence, light propagated to the recording layer 5 is a light pencil having a numerical aperture of NA and a wavelength of $\lambda$/N1. Thus, the surface of the recording layer 5 receives a light pencil having a wavelength of $\lambda$/N1 and a numerical aperture of NA.

As compared with a typical arrangement in which the laser beam 11 is gathered by a light-gathering lens 1 on the recording layer 5, it is possible to reduce a beam spot diameter to 1/N1 regarding the laser beam 11 gathered on the recording layer 5; consequently, the SIL 21 can further increase the density of information being optically recorded in the recording layer 5.

[Embodiment 3]

Figure 4A:
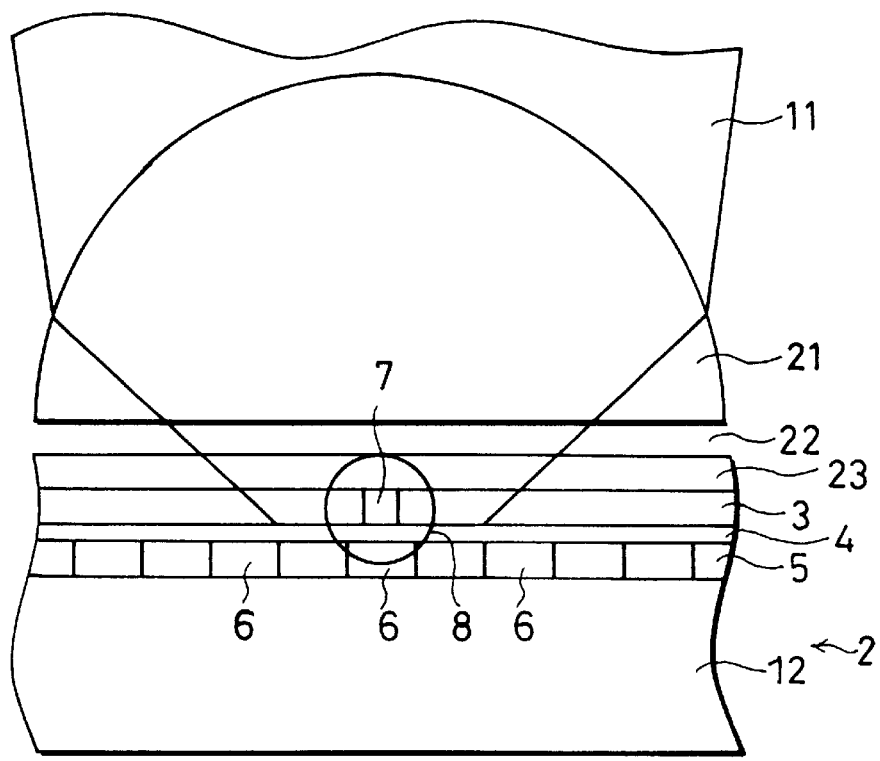
FIG. 4(a) is a schematic diagram showing an optical reproducing and recording method, an optical disk, and an optical device in accordance with Embodiment 3 of the present invention.
Figure 4B:
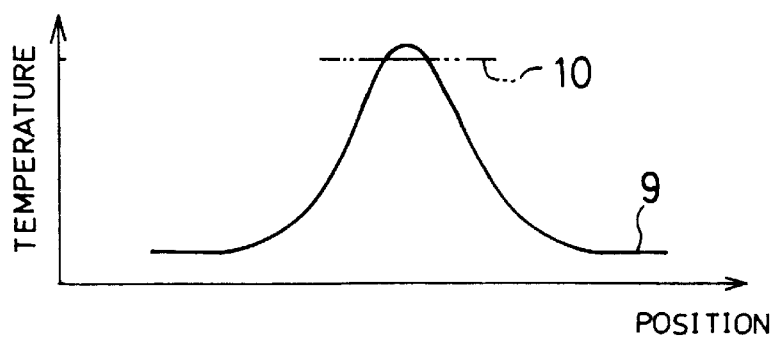
FIG. 4(b) is a graph showing a temperature distribution on a mask layer of the optical device.
Figure 5:
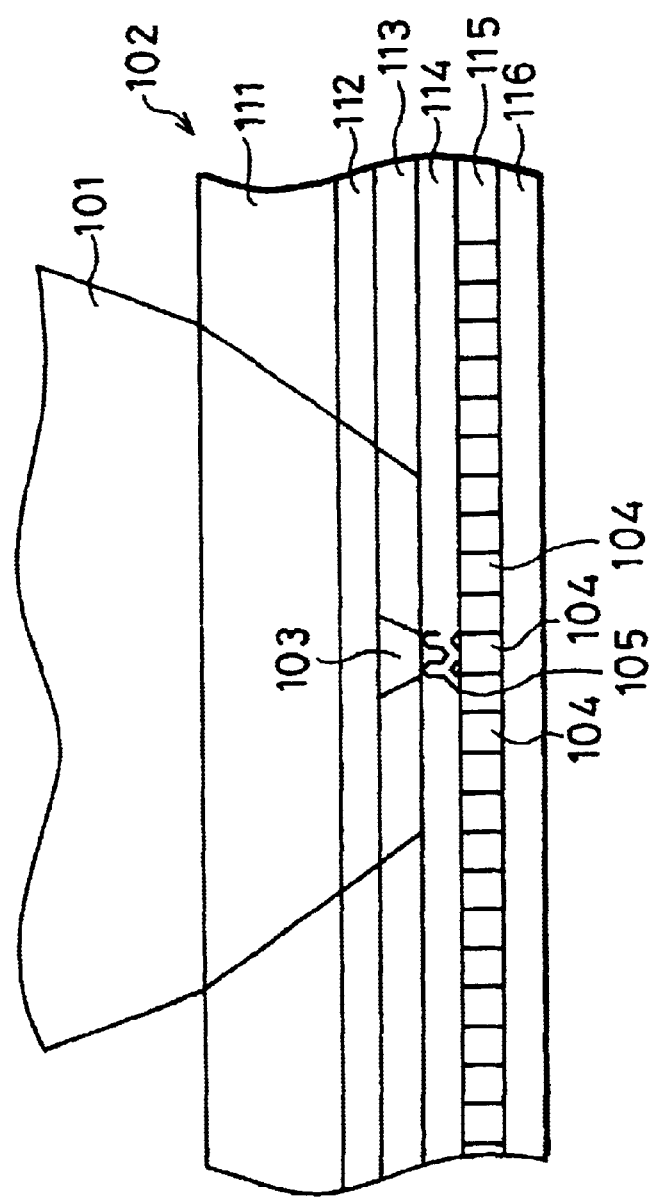
FIG. 5 is a schematic diagram showing a conventional optical reproducing and recording method.

Referring to FIG. 4, the following explanation describes Embodiment 3 of the present invention. Here, in Embodiment 3, those members that have the same functions and that are described in Embodiments 1 and 2 are indicated in FIG. 4 by the same reference numerals as those of FIGS. 1 to 3, and the description thereof is omitted.

In Embodiment 3, a laser beam 11, which is gathered by the SIL 21, is emitted through a gap 22 and a second protection film 23 to a mask layer 3. The second protection film 23 is provided for preventing the SIL 21 from colliding against the mask layer 3, causing no damage on the mask layer 3.

In the present invention, the mask layer 3 is the most important layer, so that it is necessary to protect at least the mask layer 3. The emitted laser beam 11 generates an area 7 having a low transmittance in the mask layer 3. As a material used for the mask layer 3, it is possible to adopt a material such as silver oxide and tellurium oxide besides the aforementioned organic compound and inorganic compound.

Silver oxide and tellurium oxide has a high transmittance as insulators at room temperature; however, when the laser beam 11 is emitted so as to increase the temperature to 100 to 200° C. or more, the transmittance decreases and the reflectance increases. In addition, the material is changed into a conductor. Therefore, the material is suitable for practical use of the present invention. Furthermore, a generated near field 8 records and reproduces a recording mark 6 in a recording layer 5 in the same manner as described in Embodiments 1 and 2.

Incidentally, when light of the near field 8 and the recording mark 6 are interacted with each other upon reproduction, light is scattered in all directions from an interaction point. The light corresponds to the recording mark 6, namely, recorded information. Therefore, the SIL 21 efficiently gathers the scattered light, thereby increasing the intensity of a reproduction signal from the recording mark 6; consequently, it is possible to obtain a reproduction signal with a high S/N ratio.

When using only an object lens described in Embodiment 1, a solid angle for gathering scattered light is smaller than the SIL 21; thus, it is not possible to efficiently gather light as compared with the SIL 21. However, in the case of the SIL 21, a solid angle can be set larger than that of the object lens 1, so that it is possible to gather a larger amount of scattered light.

A near field 8 fundamentally has a small intensity of light, so that it is necessary to efficiently gather reproduction light to achieve a high S/N ratio; therefore, the construction of an optical disk 2 and the SIL 21 make the most suitable combination so as to significantly contribute to realize an optical memory using light of the near field 8. The optical disk 2 generates the area 7 in which reflectance is reduced.

Here, silver oxide and tellurium oxide used in the mask layer 3 can be also adopted in Embodiments 1 and 2.

Further, as a result of an experiment, regarding the optical reproducing and recording method and the optical device of the present invention, silver oxide (10 nm–50 nm in thickness) is used for the mask layer 3, GeSbTe (10 nm–50 nm in thickness) is used for the recording layer 5, and ZnS—SiO$_2$ (5 nm–60 nm in thickness) is used for a protection layer between the mask layer 3 and the recording layer 5, so that a large C/N ratio (Carrier to Noise Ratio) can be obtained, thereby achieving a favorable result.

Particularly, when the mask layer 3 is 10 nm–50 nm in thickness, the recording layer 5 is 10 nm–30 nm in thickness, and the protection layer is 40 nm–60 nm in thickness, a larger C/N ratio can be obtained. In this case, a laser wavelength is set at 635 nm, a numerical aperture of the object lens is set at 0.6, and a lineal speed of the optical disk 2 and a beam spot of the laser beam 11 is set at 6 m/s.

Regarding the optical disk 2 of the optical reproducing and recording method and the optical device in accordance with the present invention, when a film thickness d of the protection layer is set by the following equation: $d = a \times \lambda / n$ ($a = 0.018 – 0.22$), where n represents a refractive index of the protection layer and $\lambda$ represents a laser wavelength of the protection layer, it is possible to achieve a favorable result including a larger C/N ratio.

As mentioned above, in an optical reproducing and recording method of the present invention, a light beam is emitted onto a mask layer, which is formed on a substrate containing a sample having information and which reduces transmittance of light due to light or heat, and the sample and a near field interact with each other so as to reproduce and record information, the near field appearing around an area of the mask layer that has transmittance being reduced by the light beam.

According to the above method, a light beam is emitted so as to generate light of the near field on the sample around an area of the mask layer, the area having reduced transmittance of light, so that light of the near field and the sample can interact with each other and scattered light occurs from light of the near field based on information.

In this case, the above method can detect scattered light in a large area having a high transmittance of light on the mask layer other than an area in which transmittance is reduced, so that information of the sample can be reproduced with a high S/N ratio.

As described above, according to another optical reproducing and recording method of the present invention, a light beam is emitted onto a mask layer, which is formed on a substrate containing a sample having information and which increases free electrons due to light or heat, and the sample and a near field interact with each other so as to reproduce and record information, the near field appearing around an area of the mask layer that has more free electrons.

With this method, plasmon is pumped in a minute area in which free electrons are increased by a light beam, so that it is possible to write or read information in the sample by using a high intensity of the near field, which appears around the minute area because of plasmon. According to this method, the near field with a high intensity makes it easy to write information into the sample. Further, when reading information from the sample, the near field with a high intensity makes it possible to obtain a higher S/N ratio.

In the above optical reproducing and recording method, the substrate can be also provided with a recording layer as a sample for optically recording information. According to this method, interaction between the recording layer and the near field appearing around the minute area on the mask layer makes it possible to record or reproduce information with a high recording density.

In the above optical reproducing and recording method, the near field can be formed by using a hemispheric lens, which includes the mask layer at a position opposing the sample. According to this method, the mask layer is provided on the hemispheric lens separated from the substrate, so that the mask layer can be formed separately from the substrate. Consequently, it is easy to replace the sample such as an optical recording medium so as to readily realize an optical microscope and a medium-exchangeable optical memory.

In the above optical reproducing and recording method, the hemispheric lens or an ultra-hemispheric lens, that is formed closely to the substrate, can be used for gathering light as reproduction light having information, the light being scattered by interaction between the sample and the near field appearing in the mask layer.

With this method, a solid angle of the hemispheric or ultra-hemispheric lens can be set larger than that of a typical object lens so as to more efficiently gather light scattered by interaction between the near field and the sample. Thus, this method makes it possible to more positively reproduce information, which is recorded with a high recording density, from the scattered light, thereby readily achieving, for example, an optical memory using the near field.

As described above, an optical device of the present invention has a construction in which the substrate contains the sample, an optical system records or reproduces optical information of the sample being disposed so as to emit a laser beam to the sample, and the mask layer, in which transmittance of light is reduced by the laser beam, is disposed so as to form the near field in the sample by the laser beam.

According to this arrangement, when a light beam is emitted onto the mask layer, it is possible to partially form an area in which transmittance of light is reduced on the mask layer, so that light of the near field can be generated around the area on a part of the sample that corresponds to the area. Hence, this arrangement makes it possible to realize interaction between the sample and light of the near field, so that the interaction can generate scattered light from light of the near field based on information.

In this case, according to this arrangement, it is possible to detect the scattered light from a larger area having a high transmittance of light on the mask layer other than an area in which transmittance is reduced. Hence, it is possible to reproduce information of the sample with a higher S/N ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical reproducing and recording method comprising the steps of:

emitting a light beam onto a mask layer which is formed on a substrate containing a sample having information and which reduces transmittance of light due to light or heat, the mask layer being made of a material showing a thermo-optical effect in which transmittance of light is reduced in accordance with an increase in temperature, or a material showing a thermo-optical effect in which transmittance of light is reduced only in an area receiving a large amount of light; and reproducing or recording the information by interaction between said sample and a near field which appears around an area of said mask layer, said area having transmittance being reduced by the light beam.

2. An optical reproducing and recording method comprising the steps of:

emitting a light beam onto a mask layer which is formed on a substrate containing a sample having information and which increases free electrons due to light or heat; and reproducing or recording the information by interaction between said sample and a near field which appears around an area of said mask layer, said area having more free electrons.

3. The optical reproducing and recording method as defined in claim 1, wherein said substrate includes a recording layer as the sample for optically recording information.

4. The optical reproducing and recording method as defined in claim 2, wherein said substrate includes a recording layer as the sample for optically recording information.

5. The optical reproducing and recording method as defined in claim 1, wherein said near field is formed by a hemispheric lens having said mask layer at a position opposing to said sample.

6. The optical reproducing and recording method as defined in claim 2, wherein said near field is formed by using a hemispheric lens having said mask layer at a position opposing to said sample.

7. The optical reproducing and recording method as defined in claim 1, wherein light is scattered by interaction between said sample and said near field generated in said mask layer, and the light is gathered as reproduction light having information by using a hemispheric or ultra-hemispheric lens being adjacent to said substrate.

8. The optical reproducing and recording method as defined in claim 2, wherein light is scattered by interaction between said sample and said near field generated in said mask layer, and the light is gathered as reproduction light having information by using a hemispheric or ultra-hemispheric lens being adjacent to said substrate.

9. A recording medium comprising:
   a substrate;
   a recording layer over said substrate, information being recorded in said recording layer by radiation of light; and
   a mask layer over said substrate, in which transmittance of light is reduced by radiation of a light beam so as to form a near field by using said light beam in said recording layer, the mask layer being made of a material showing a thermo-optical effect in which transmittance of light is reduced in accordance with an increase in temperature, or a material showing a thermo-optical effect in which transmittance of light is reduced only in an area receiving a large amount of light; and
   wherein said recording layer and said mask layer are arranged so that said light beam passes through said mask layer before being emitted onto said recording layer.

10. The recording medium as defined in claim 9, further comprising a protection layer stacked between said recording layer and said mask layer.

11. The recording medium as defined in claim 9, wherein said recording layer is made of a magneto-optical recording material.

12. The recording medium as defined in claim 9, wherein said recording layer is made of a phase change material that shows a phase change according to an increase in temperature.

13. The recording medium as defined in claim 9, wherein said mask layer is made of silver oxide or tellurium oxide.

14. The recording medium as defined in claim 10, wherein said protection layer is made of $ZnS-SiO_2$, said recording layer is made of GeSbTe, and said mask layer is made of silver oxide or tellurium oxide.

15. The recording medium as defined in claim 14, wherein said mask layer has a thickness of 10–50 nm, said recording layer has a thickness of 10–50 nm, and said protection layer has a thickness of 5–60 nm.

16. The recording medium as defined in claim 14, wherein said mask layer has a thickness of 10–30 nm, said recording layer has a thickness of 10–30 nm, and said protection layer has a thickness of 40–60 nm.

17. The recording medium as defined in claim 14, wherein said protection layer has a film thickness of d represented by $d=a \times \lambda/n$ (a=0.018–0.22), where n represents a refractive index of said protection layer and represents a laser wavelength.

18. A recording medium comprising:
   a substrate;
   a recording layer over said substrate, information being recorded in said recording layer by radiation of light; and
   a mask layer over said substrate, in which free electrons are increased by radiation of a light beam so as to form a near field by using said light beam in said recording layer,
   wherein said recording layer and said mask layer are arranged so that said light beam passes through said mask layer before being emitted onto said recording layer.

19. The recording medium as defined in claim 18, wherein said mask layer generates plasmon by a resonance with said light beam at a position emitted said light beam.

20. An optical device comprising:
   a substrate containing a sample having information,
   an optical system for recording or reproducing said information being disposed so as to emit a light beam to said sample, and
   a mask layer, in which transmittance of light is reduced by said light beam, is disposed so as to form a near field in said sample by using said light beam, the mask layer being made of a material showing a thermo-optical effect in which transmittance of light is reduced in accordance with an increase in temperature, or a material showing a thermo-optical effect in which transmittance of light is reduced only in an area receiving a large amount of light.

21. The optical device as defined in claim 20, wherein transmittance of light is reduced by heat of said light beam in said mask layer.

22. The optical device as defined in claim 20, wherein said optical system includes a hemispheric or ultra-hemispheric lens for gathering said light beam in said sample.

23. The optical device as defined in claim 22, wherein said mask layer is disposed on a light-emitting surface of said lens.

24. An optical device comprising:
   a substrate containing a sample having information,
   an optical system for recording or reproducing said information being disposed so as to emit a light beam to said sample, and
   a mask layer, in which free electrons are increased by said light beam, is disposed so as to form a near field in said sample by said light beam.

25. The optical device as defined in claim 1, wherein said optical system includes a hemispheric or ultra-hemispheric lens for gathering said light beam in said sample.

26. The optical device as defined in claim 25, wherein said mask layer is disposed on a light-emitting surface of said lens.

* * * * *